US009360194B2

(12) United States Patent
Lee

(10) Patent No.: US 9,360,194 B2
(45) Date of Patent: Jun. 7, 2016

(54) FRAME OF BACKLIGHT MODULE, A BACKLIGHT MODULE AND A DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Sang Jig Lee, Beijing (CN)

(73) Assignees: BOE Technology Group Co., Ltd. (CN); Beijing BOE Display Technology Co., Ltd. (CN)

( * ) Notice: Subject to any disclaimer, the term of this patent is extended or adjusted under 35 U.S.C. 154(b) by 270 days.

(21) Appl. No.: 14/095,345

(22) Filed: Dec. 3, 2013

(65) Prior Publication Data

US 2014/0153222 A1    Jun. 5, 2014

(30) Foreign Application Priority Data

Dec. 4, 2012    (CN) .......................... 2012 1 0511483

(51) Int. Cl.
 F21V 21/14    (2006.01)
 G02F 1/1333    (2006.01)
 G02F 1/1335    (2006.01)

(52) U.S. Cl.
 CPC .......... *F21V 21/14* (2013.01); *G02F 1/133308* (2013.01); *G02F 1/133608* (2013.01); *G02F 2001/133314* (2013.01); *G02F 2001/133322* (2013.01)

(58) Field of Classification Search
 CPC   G02B 6/0093;  G02B 6/0095;  G02F 1/13306; G02F 1/133308
 USPC .................................................. 362/632–634
 See application file for complete search history.

(56) References Cited

U.S. PATENT DOCUMENTS

| 5,211,464 A * | 5/1993 | Bohmer | ................ F21V 19/009 362/634 |
| 8,491,174 B2 * | 7/2013 | Derichs | ................ G02B 6/0011 362/612 |
| 8,870,437 B2 * | 10/2014 | Yoshikawa | ........ G02F 1/133608 349/58 |

(Continued)

FOREIGN PATENT DOCUMENTS

| CN | 101114077 | 1/2008 |
| CN | 101476689 | 7/2009 |

(Continued)

OTHER PUBLICATIONS

Machine Translation of CN102287761A.*

(Continued)

*Primary Examiner* — Evan Dzierzynski
*Assistant Examiner* — Christopher E Dunay
(74) *Attorney, Agent, or Firm* — Baker Hostetler LLP

(57) ABSTRACT

The present invention relates to display technology and more particularly to a frame of backlight module, a backlight module and a display device. The present invention can prevent occurrence of a chip on film crack ("COF"-Crack") and formation of foreign matters. As for the frame of backlight module, barrier walls are disposed respectively on the opposite two sides of the frame, the vertical distance of the barrier wall located on at least one side of the frame is adjustable with respect to the center of the frame. Both the backlight module and the display device employ the above frame.

18 Claims, 2 Drawing Sheets

(56) References Cited

U.S. PATENT DOCUMENTS

| | | | | |
|---|---|---|---|---|
| 8,926,163 | B2 * | 1/2015 | Su | G02B 6/0011 362/615 |
| 2006/0066772 | A1 | 3/2006 | Takahashi et al. | |
| 2006/0290834 | A1 | 12/2006 | Jeon | |
| 2010/0066938 | A1 * | 3/2010 | Lee | G02B 6/0088 349/58 |
| 2010/0258697 | A1 * | 10/2010 | Tseng | B25B 11/00 248/298.1 |
| 2012/0287666 | A1 * | 11/2012 | Kwon | G02F 1/133615 362/602 |
| 2013/0044516 | A1 * | 2/2013 | Yu | G02B 6/0088 362/612 |

FOREIGN PATENT DOCUMENTS

| | | | |
|---|---|---|---|
| CN | 201359672 | 12/2009 | |
| CN | 101988691 | 3/2011 | |
| CN | 102287761 A * | 12/2011 | G02F 1/1336 |
| CN | 202120005 | 1/2012 | |
| CN | 102662262 | 9/2012 | |
| JP | 2006310221 | 11/2006 | |
| KR | 100927162 B1 * | 11/2009 | |

OTHER PUBLICATIONS

Machine Translation of KR100927162B1.*
First Office Action issued in corresponding Chinese Application No. CN201210511483.2 dated Nov. 29, 2013.
Second Office Action issued in corresponding Chinese Application No. CN201210511483.2 dated Aug. 28, 2014.
Extended European Search Report issued in corresponding European Application No. 13195257.4 dated Mar. 25, 2014.

* cited by examiner

FRAME OF BACKLIGHT MODULE, A BACKLIGHT MODULE AND A DISPLAY DEVICE

CROSS REFERENCE

The present application claims a priority of the Chinese patent application No. 201210511483.2 filed on Dec. 4, 2012, which is incorporated herein by reference in its entirety.

FIELD OF THE INVENTION

The present invention relates to display technology, particularly relates to a frame of backlight module, a backlight module and a display device.

BACKGROUND OF THE INVENTION

A display panel of the display device is installed on the frame of the backlight module. As shown in FIG. 1, a barrier wall 3 is disposed on the frame 2 of the backlight module for controlling the movement of the display panel 1. The barrier walls of the prior art are disposed on the opposite two sides of the frame of the backlight module, and are formed integrally with the frame of the backlight module.

With the display device becoming large-sized, not only the display panel tends to be large-sized, but also the frame of the backlight module becomes more and more large. As the dimensions of components become large-sized, the scope of management tolerance achieved in processing becomes more and more large. Due to processing errors and assembly, a gap is inevitably formed between the display panel and the frame of the backlight module, and the gap becomes more and more large. Therefore, the movement of the display panel is easily occurred during vibration test or transportation, which results in Chip On Film Crack (COF Crack), and foreign matters may be formed when the display panel is moving.

SUMMARY OF THE INVENTION

The problem to be solved by the present invention is to provide a frame of backlight module, a backlight module and a display device, which can prevent occurrence of COF Crack and formation of foreign matters.

To solve the above problem, the embodiment of the present invention provides a frame of backlight module, barrier walls are disposed respectively on the opposite two sides of the frame, the vertical distance of the barrier wall located on at least one side of the frame is adjustable with respect to the center of the frame.

For example, the barrier wall located on one side of the frame is fixed, and the barrier wall located on the other side of the frame is adjustable, in which a supporting portion for supporting the side of the display panel is disposed on one side of the adjustable barrier wall, a wedge-shaped surface is disposed on the other side of the adjustable barrier wall; a wedge-shaped guide surface matched with the wedge-shaped surface is disposed on the inner wall of the frame; and a positioning member for positioning the adjustable barrier wall is disposed on the frame.

For example, an opening hole is disposed on the adjustable barrier wall along the direction of the wedge-shaped surface.

For example, the opening hole is elongated.

For example, the positioning member is a screw disposed in the opening hole and a threaded hole disposed on the frame to match with the screw.

For example, two stoppers are disposed on the frame; the two stoppers are located in the opening hole and disposed on the two sides of the screw.

For example, a flexible material is disposed on the supporting portion.

To solve the above problem, the embodiment of the present invention also provides a backlight module, comprising the frame as mentioned above.

To solve the above problem, the embodiment of the present invention also provides a display device, comprising the backlight module as mentioned above.

The advantageous effects of the above technical solutions of the present invention are as following:

In each technical solution as mentioned above, because the vertical distance of the barrier wall which is located on at least one side of the frame is adjustable with respect to the center of the frame, it is convenient for the assembly of the display panel on the frame of the backlight module, and after assembling, it can also achieve the adjustment of the gap between the display panel and the barrier walls located on two sides of the frame of the backlight module by means of adjusting the vertical distance of the barrier wall with respect to the center of the frame, it can prevent a large gap from being formed between them, thereby it can prevent occurrence of COF Crack and formation of foreign matters.

DETAILED DESCRIPTION OF THE PREFERRED EMBODIMENTS

To make the problems to be solved, technical solutions and advantages of the present invention more clear, it will be described in detail with reference to the drawings and the specific embodiments hereinafter.

The present invention aims to solve the problem that the gap between the barrier walls located on two sides of the frame of the backlight module and the display panel is too large so that COE Crack may easily occur and foreign matters may be formed in the display device of the prior art, especially in the large-sized display device, by providing a frame of backlight module, a backlight module and a display device.

Figure 1:
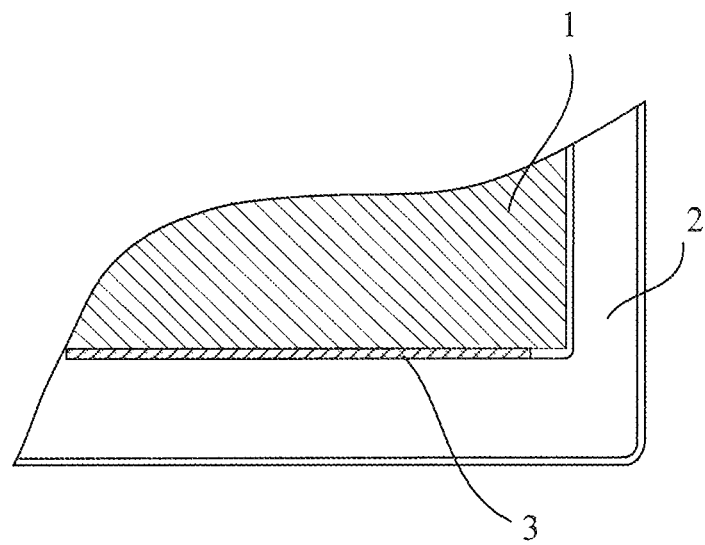
FIG. 1 is a schematic view of the barrier wall located on one side of the frame of the backlight module in the prior art.
Figure 2:
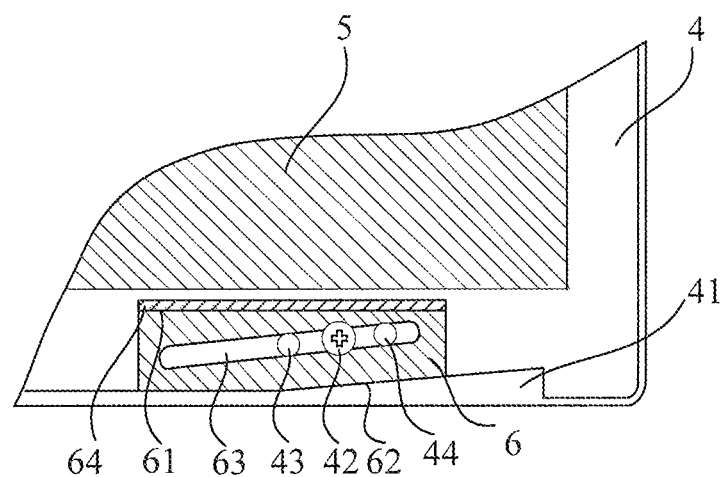
FIG. 2 is a schematic view of the barrier wall located on one side of the frame of the backlight module according to the embodiment of the present invention (before adjustment)
Figure 3:
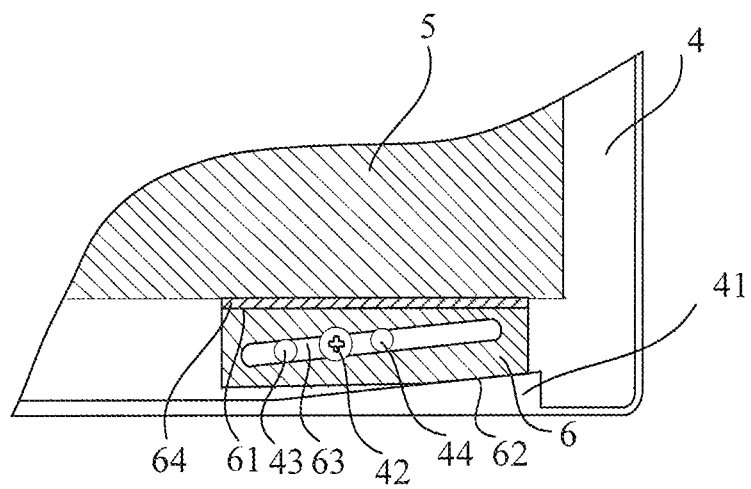
FIG. 3 is a schematic view of the barrier wall located on one side of the frame of the backlight module according to the embodiment of the present invention (after adjustment).

As shown in FIGS. 2 and 3, in the embodiments of a frame of backlight module according to the present invention, barrier walls 6 are disposed respectively on the opposite two sides of the frame 4 of the backlight module, the vertical distance of the barrier wall 6 located on at least one side of the frame is adjustable with respect to the center of the frame 4.

In the technical solutions of the frame of the backlight module, because the vertical distance of the barrier wall 6 located on at least one side of the frame 4 is adjustable with respect to the center of the frame 4, it is convenient for the assembly of the display panel 5 on the frame 4 of the backlight module, and after assembling, it can also achieve the adjustment of the gap between the display panel 5 and the barrier walls located on two sides of the frame 4 of the backlight module by means of adjusting the vertical distance of the barrier wall 6 with respect to the center of the frame 4, it can prevent a large gap from being formed between them, thereby it can prevent occurrence of COF Crack and formation of foreign matters.

In the foregoing embodiments of the frame of the backlight module, optionally, the vertical distances of the barrier walls 6 located on the opposed two sides of the frame 4 are adjustable with respect to the center of the frame 4. However, in order to save adjustment action conveniently and improve the assembly efficiency, for example, the barrier wall 6 located on one side of the frame 4 is fixed, the barrier wall 6 located on the other side of the frame 4 is adjustable, in which a supporting portion 61 for supporting the side of the display panel 5 is disposed on one side of the adjustable barrier wall 6, a wedge-shaped surface 62 is disposed on the other side of the adjustable barrier wall 6. A wedge-shaped guide surface 41 matched with the wedge-shaped surface 62 is disposed on the inner wall of the frame 4, and a positioning member for positioning the adjustable barrier wall is disposed on the frame 4.

By making the wedge-shaped surface 62 of the adjustable barrier wall 6 move along the wedge-shaped guide surface 41 on the inner wall of the frame 4, the position of the adjustable barrier wall 6 can be adjusted, thereby the gap between the display panel 5 and the barrier walls 6 located on two sides of the frame 4 of the backlight module can be controlled, for example, the gap is adjusted to be zero. After proper adjustment, the adjustable barrier wall 6 is positioned by the positioning member so as to keep the adjusted gap.

It should be understood that, in the above embodiments, it takes that the movement of the wedge-shaped surface of the adjustable barrier wall along the wedge-shaped guide surface of the inner wall of the frame can be adjusted as an example to illustrate how to adjust the vertical distance of the barrier wall located on at least one side of the frame with respect to the center of the frame, but the present invention is not limited to that, it may also take other ways to adjust the vertical distance of the barrier wall with respect to the center of the frame, for example, the barrier wall can be rotated.

In the foregoing embodiments of the frame of the backlight module, in order to take advantage of the space and enable easy arrangement of the positioning member, for example, on the adjustable barrier wall 6, an opening hole is disposed along the direction of the wedge-shaped surface 62, the opening hole 63 may be elongated (the following explanations are made by taking the elongated opening hole as an example, but not limited to that, for example it also may be a circular opening hole). The positioning member is a screw 42 disposed in the elongated opening hole 63 and a threaded hole disposed on the frame 4 to match with the screw 42. After the barrier wall is adjusted to the proper position, the screw 42 is tightened to fix the adjustable barrier wall 6 on the frame 4 of the backlight module for positioning.

In the foregoing embodiments of the frame of the backlight module, for example, two stoppers 43, 44 are disposed on the frame 4. The two stoppers 43, 44 are located in the elongated opening hole 63 and disposed on the two sides of the screw 42. By means of the stoppers 43, 44, the moving range of the barrier wall 6 can be properly controlled to avoid interference with other components.

For example, a flexible material 64, such as sponge or plastic, is disposed on the supporting portion 61 of the adjustable barrier wall 6 which is used for supporting the side of the display panel 5 in order to absorb impact force.

The embodiment of the present invention also provides a backlight module, comprising the frame of the backlight module, in which the frame of the backlight module is the frame according to any one of the above embodiments.

The embodiment of the present invention also provides a display device, comprising the above backlight module, the backlight module comprises the frame of the backlight module, a display panel is installed on the frame of the backlight module, in which the frame of the backlight module is the frame according to any one of the above embodiments. The display device may be: Liquid Crystal Display (LCD) panel, electronic paper, organic light emitting diode (OECD) panel, LCD TV, LCD monitor, digital photo frame, mobile phone, tablet personal computer and any other products or components with a display function.

In the above embodiments of the backlight module and the display device, because the vertical distance of the barrier wall located on at least one side of the frame is adjustable with respect to the center of the frame, it is convenient for the assembly the display panel on the frame of the backlight module, and after assembling, it can also achieve the adjustment of the gap between the display panel and the barrier walls located on two sides of the frame of the backlight module by means of adjusting the vertical distance of the barrier wall with respect to the center of the frame, it can prevent a large gap from being formed between them, thereby it can prevent occurrence of COF Crack and formation of foreign matters.

Some embodiments of the present invention have been described as above, it should be pointed that, to the person in the art, various improvements and modifications can be made hereto without departing from the spirit of the present invention, and the improvements and modifications should be included in the scope of the present invention.

What is claimed is:

1. A frame, comprising:
    a first and a second inner sides of said frame, arranged to be opposite to each other;
    a first and a second barrier walls, arranged to support a display panel, and disposed respectively on the first and the second inner sides of said frame;
    a supporting portion, arranged to support a side of said display panel opposite to the second inner side of said frame, and disposed on the second barrier wall; and
    a fixing member, arranged to releasably fix the second barrier wall onto the second inner side of said frame, and disposed on said frame,
    wherein a surface of the second barrier wall capable of being in contact with a surface of the second inner side of said frame is a wedge-shaped surface, the surface of the second inner side of said frame is a wedge-shaped guide surface matched with said wedge-shaped surface, and a vertical distance between the second barrier wall and the center of said frame is adjustable by moving the second barrier wall on the surface of the second inner side of said frame.

2. The frame according to claim 1, wherein an opening hole is disposed on the second barrier wall along the direction of said wedge-shaped surface.

3. The frame according to claim 2, wherein said opening hole is elongated.

4. The frame according to claim 2, wherein said fixing member is a screw disposed in said opening hole and a threaded hole disposed on said frame to match with said screw.

5. The frame according to claim 4, wherein two stoppers are disposed on said frame;
    said two stoppers are located in said opening hole and disposed on the two sides of said screw.

6. The frame according to claim 1, wherein a flexible material is disposed on said supporting portion.

7. The frame according to claim 2, wherein a flexible material is disposed on said supporting portion.

8. The frame according to claim 3, wherein a flexible material is disposed on said supporting portion.

9. The frame according to claim 4, wherein a flexible material is disposed on said supporting portion.

10. The frame according to claim 5, wherein a flexible material is disposed on said supporting portion.

11. A backlight module, comprising said frame according to claim 1.

12. The backlight module according to claim 11, wherein an opening hole is disposed on the second barrier wall along the direction of said wedge-shaped surface.

13. The backlight module according to claim 12, wherein said opening hole is elongated.

14. The backlight module according to claim 12, wherein said fixing member is a screw disposed in said opening hole and a threaded hole disposed on said frame to match with said screw.

15. The backlight module according to claim 14, wherein two stoppers are disposed on said frame;
    said two stoppers are located in said opening hole and disposed on the two sides of said screw.

16. The backlight module according to claim 11, wherein a flexible material is disposed on said supporting portion.

17. A display device, comprising said backlight module according to claim 11.

18. The frame according to claim 1, wherein the first barrier wall is fixed onto the first inner side of said frame.

\* \* \* \* \*